US010813511B2

(12) United States Patent
Takano et al.

(10) Patent No.: US 10,813,511 B2
(45) Date of Patent: Oct. 27, 2020

(54) ELECTRIC VACUUM CLEANER

(71) Applicants: Mitsubishi Electric Corporation, Tokyo (JP); Mitsubishi Electric Home Appliance Co., Ltd., Fukaya-shi, Saitama (JP)

(72) Inventors: Koshiro Takano, Tokyo (JP); Marika Haramaki, Tokyo (JP); Yohei Asahi, Tokyo (JP); Kimiyoshi Soma, Saitama (JP)

(73) Assignees: Mitsubishi Electric Corporation, Tokyo (JP); Mitsubishi Electric Home Appliance Co., Ltd., Fukaya-shi, Saitama (JP)

( * ) Notice: Subject to any disclaimer, the term of this patent is extended or adjusted under 35 U.S.C. 154(b) by 225 days.

(21) Appl. No.: 15/756,110

(22) PCT Filed: Jan. 8, 2016

(86) PCT No.: PCT/JP2016/050483
§ 371 (c)(1),
(2) Date: Feb. 28, 2018

(87) PCT Pub. No.: WO2017/119119
PCT Pub. Date: Jul. 13, 2017

(65) Prior Publication Data
US 2018/0289227 A1    Oct. 11, 2018

(51) Int. Cl.
*A47L 9/16* (2006.01)
*A47L 5/24* (2006.01)
(Continued)

(52) U.S. Cl.
CPC ............... *A47L 9/1666* (2013.01); *A47L 5/24* (2013.01); *A47L 9/0081* (2013.01); *A47L 9/127* (2013.01);
(Continued)

(58) Field of Classification Search
CPC ..................................................... A47L 9/1666
See application file for complete search history.

(56) References Cited

U.S. PATENT DOCUMENTS

| 5,267,371 A | 12/1993 | Soler et al. |
| 2008/0134462 A1 | 6/2008 | Jansen et al. |

(Continued)

FOREIGN PATENT DOCUMENTS

| CN | 103371777 A | 10/2013 |
| JP | 56-168054 U | 12/1981 |

(Continued)

OTHER PUBLICATIONS

Office Action dated Nov. 3, 2018 issued in corresponding Australian Patent Application No. 2016383836.
(Continued)

*Primary Examiner* — Andrew A Horton
(74) *Attorney, Agent, or Firm* — Posz Law Group, PLC

(57) ABSTRACT

There is provided an electric vacuum cleaner capable of further cleaning up air discharged from a whirling chamber which swirls air to separate dust from the air by inertial force, as well as capable of downsizing the electric vacuum cleaner's body. To this end, the electric vacuum cleaner includes: a whirling chamber configured to swirl air containing dust around a central axis to separate dust from the air containing dust, the whirling chamber having a discharge port for discharging air in the whirling chamber; a discharge pipe provided in the whirling chamber along the central axis, the discharge pipe communicating with the discharge port; and a filter provided on a downstream side of the discharge port. The filter is positioned outside of the discharge pipe on a projection plane perpendicular to the central axis.

10 Claims, 14 Drawing Sheets

(51) Int. Cl.
  *A47L 9/00* (2006.01)
  *A47L 9/12* (2006.01)
  *B01D 46/24* (2006.01)
  *B01D 45/16* (2006.01)
  *B01D 46/52* (2006.01)
  *B01D 50/00* (2006.01)

(52) U.S. Cl.
  CPC ......... *A47L 9/1608* (2013.01); *A47L 9/1683* (2013.01); *A47L 9/1691* (2013.01); *B01D 45/16* (2013.01); *B01D 46/2403* (2013.01); *B01D 46/521* (2013.01); *B01D 50/002* (2013.01); *B01D 2279/55* (2013.01)

(56) References Cited

U.S. PATENT DOCUMENTS

| | | | |
|---|---|---|---|
| 2009/0282639 | A1 | 11/2009 | Dyson et al. |
| 2014/0245560 | A1* | 9/2014 | Huang ................ A47L 11/4088 15/322 |
| 2016/0000285 | A1* | 1/2016 | Liu ...................... B01D 45/12 55/337 |

FOREIGN PATENT DOCUMENTS

| | | |
|---|---|---|
| JP | 6-054778 A | 3/1994 |
| JP | 2007-89925 A | 4/2007 |
| JP | 2007-529257 A | 10/2007 |
| JP | 2010-115513 A | 5/2010 |
| JP | 2011-224189 A | 11/2011 |
| JP | 2012-071171 A | 4/2012 |
| JP | 2013-071018 A | 4/2013 |
| JP | 2013-132339 A | 7/2013 |
| TW | M244057 U | 9/2004 |

OTHER PUBLICATIONS

Office Action dated Jan. 8, 2019 issued in corresponding JP Patent Application No. 2017-560006 (and English translation).
International Search Report of the International Searching Authority dated Mar. 15, 2016 for the corresponding international application No. PCT/JP2016/050483 (and English translation).
TW Office Action dated May 9, 2017 in the corresponding TW application No. 105109806 (partial english translation attached).
TW Office Action dated Oct. 18, 2017 in the corresponding TW application No. 105109806 (partial english translation attached).
International Preliminary Report on Patentability dated Jul. 19, 2018 issued in corresponding international patent application No. PCT/JP2016/050483.
Written Opinion of the International Searching Authority dated Mar. 15, 2016 for the corresponding International application No. PCT/JP2016/050483.
Office Action dated Mar. 2, 2020 issued in corresponding CN Patent Application No. 201680067428.5 (and English translation).

* cited by examiner

ELECTRIC VACUUM CLEANER

CROSS REFERENCE TO RELATED APPLICATION

This application is a U.S. national stage application of International Application No. PCT/JP2016/050483 filed on Jan. 8, 2016, the disclosure of which is incorporated herein by reference.

FIELD

The present invention relates to an electric vacuum cleaner.

BACKGROUND

As a conventional electric vacuum cleaner, one including a dust collection device having a centrifugal separation unit configured to whirl sucked air containing dust and separate the dust by the centrifugal force, and an electric blower provided downstream of the dust collection device, has been known. In such a cleaner, the dust collection device has a filter for filtering out the air passing through the centrifugal separation unit (for example, see PTL 1).

CITATION LIST

Patent Literature

[PTL 1] JP 2013-132339 A

SUMMARY

Technical Problem

However, in the conventional electric vacuum cleaner described in PTL 1, a pleated filter folded in the serial direction is provided between the centrifugal separation unit and the electric blower. Accordingly, the size of the electric vacuum cleaner accommodating the dust collection device (centrifugal separation unit), the filter, and the electric blower is large.

The present invention has been made to solve such a problem. The present invention provides a cyclone-type electric vacuum cleaner in which the air is whirled in a whirling chamber and dust is separated from the air by the inertial force, which enables the air discharged from the whirling chamber to be more cleaned and enables the size of the cleaner main body to be reduced.

Solution to Problem

An electric vacuum cleaner according to the present invention includes: a whirling chamber configured to swirl air containing dust around a central axis to separate dust from the air containing dust, the whirling chamber having a discharge port for discharging air in the whirling chamber; a discharge pipe provided in the swirl chamber along the central axis, the discharge pipe communicating with the discharge port; and a filter provided on a downstream side of the discharge port, the filter being positioned outside of the discharge pipe on a projection plane perpendicular to the central axis.

Advantageous Effects of the Invention

The electric vacuum cleaner according to the present invention exhibits advantageous effects that the air discharged from the whirling chamber in which the air is whirled and dust is separated from the air by the inertial force can be more cleaned, and the size of the cleaner main body can be reduced.

DESCRIPTION OF EMBODIMENTS

Figure 1:
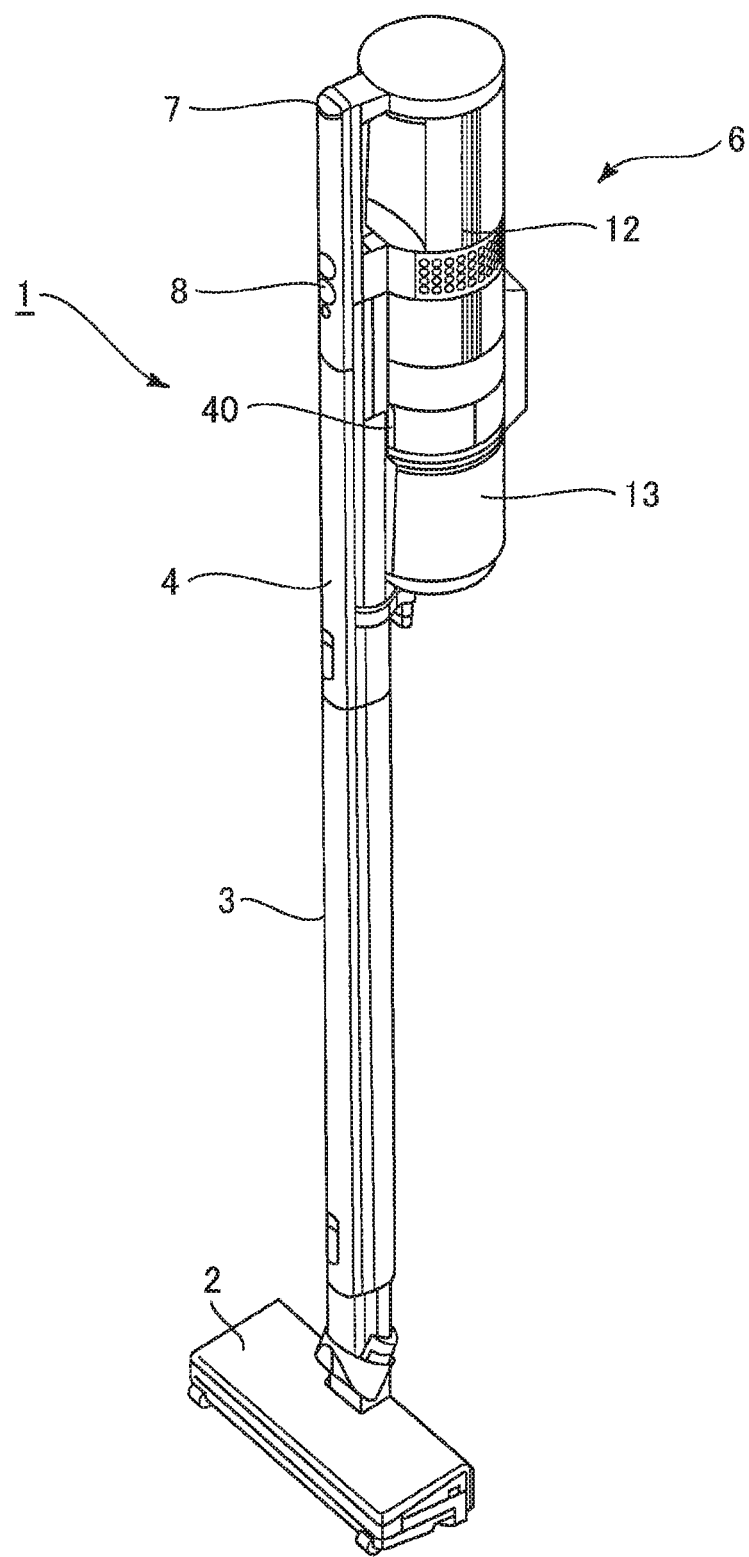
FIG. 1 is a perspective view of an electric vacuum cleaner relating to Embodiment 1 of the present invention.

Hereinafter, an embodiment of the present invention will be described with reference to the accompanying drawings. In the drawings, the same or equivalent parts are denoted by the same reference signs, and overlapping description is simplified or omitted appropriately. It should be noted that the present invention is not limited to the embodiments described below, and can be modified in various manners within the scope of the present invention.

Embodiment 1

Figure 2:
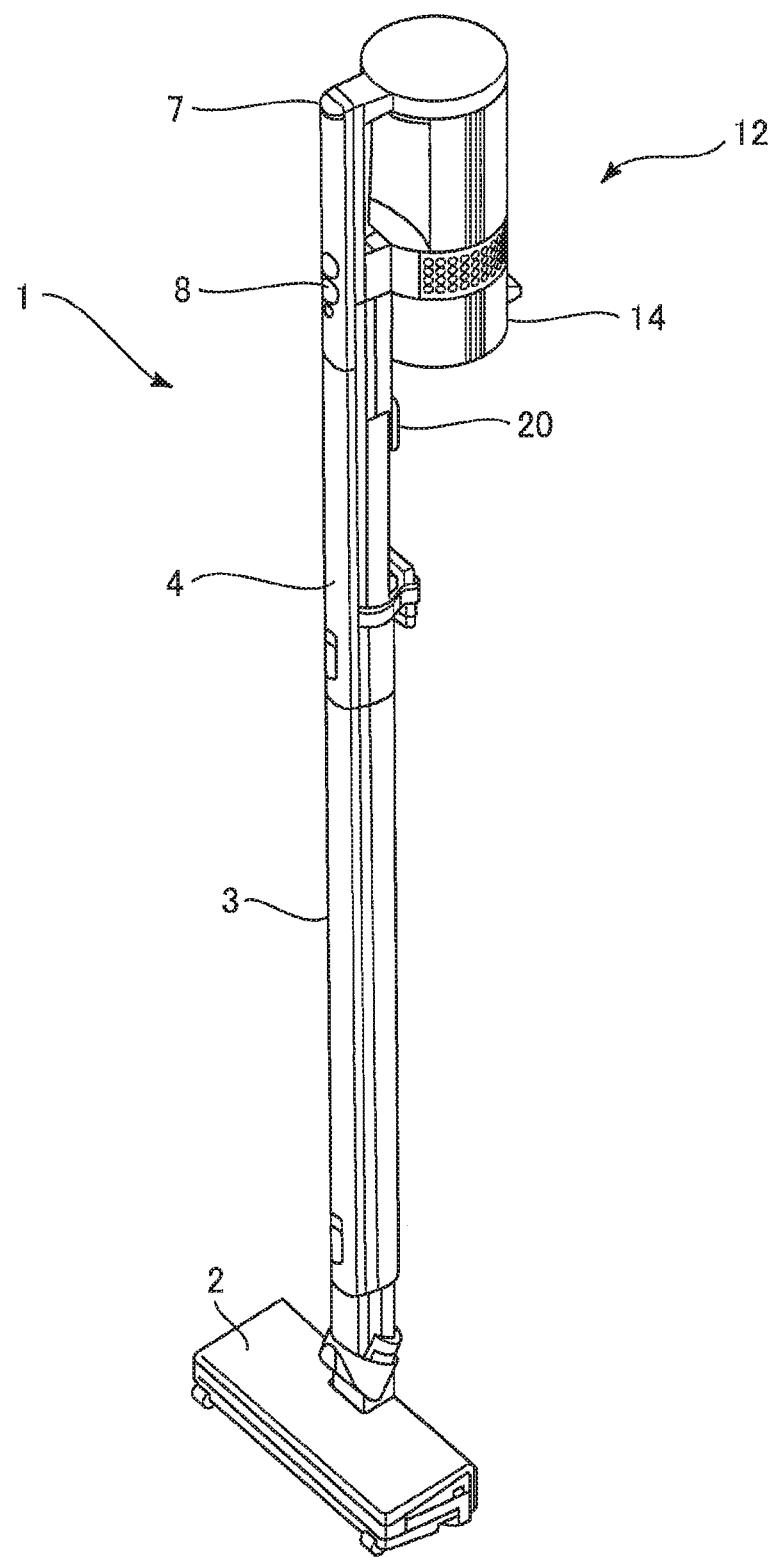
FIG. 2 is a perspective view of the electric vacuum cleaner relating to Embodiment 1 of the present invention, illustrating a state where a dust collection unit is removed from a housing unit.
Figure 3:
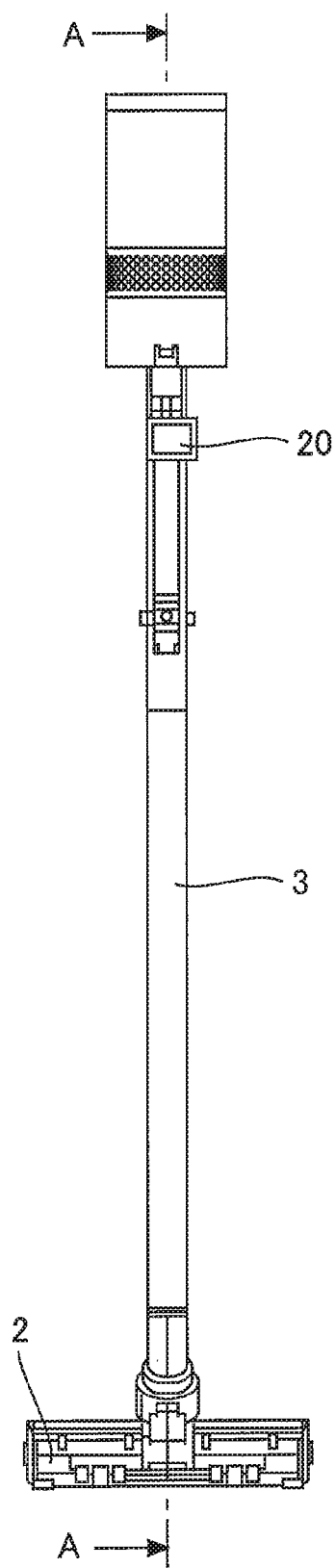
FIG. 3 is a rear view of the electric vacuum cleaner relating to Embodiment 1 of the present invention, illustrating a state where the dust collection unit is removed from the housing unit.
Figure 4:
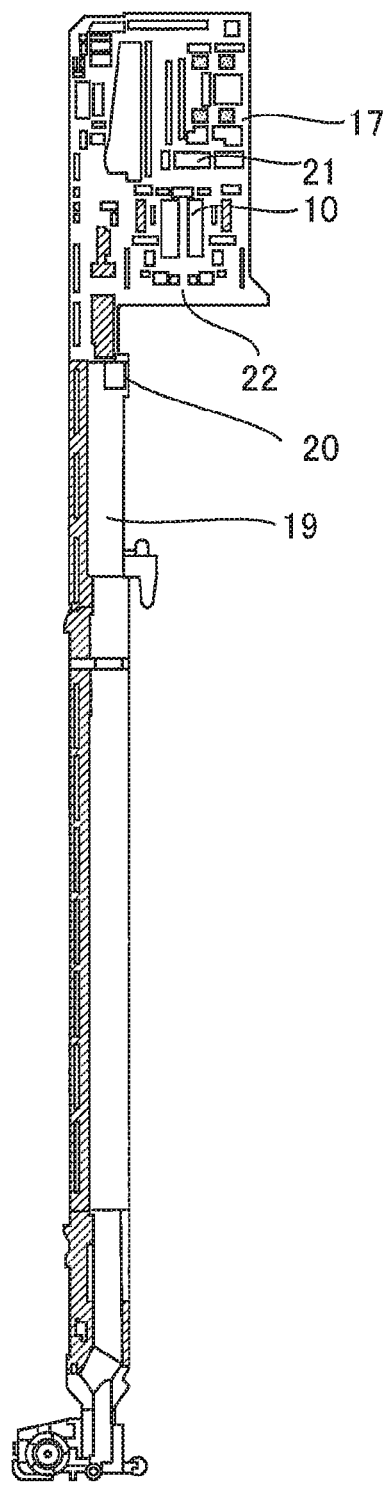
FIG. 4 is a A-A cross-sectional view of the housing unit from which the dust collection unit is removed as illustrated in FIG. 3
Figure 5:
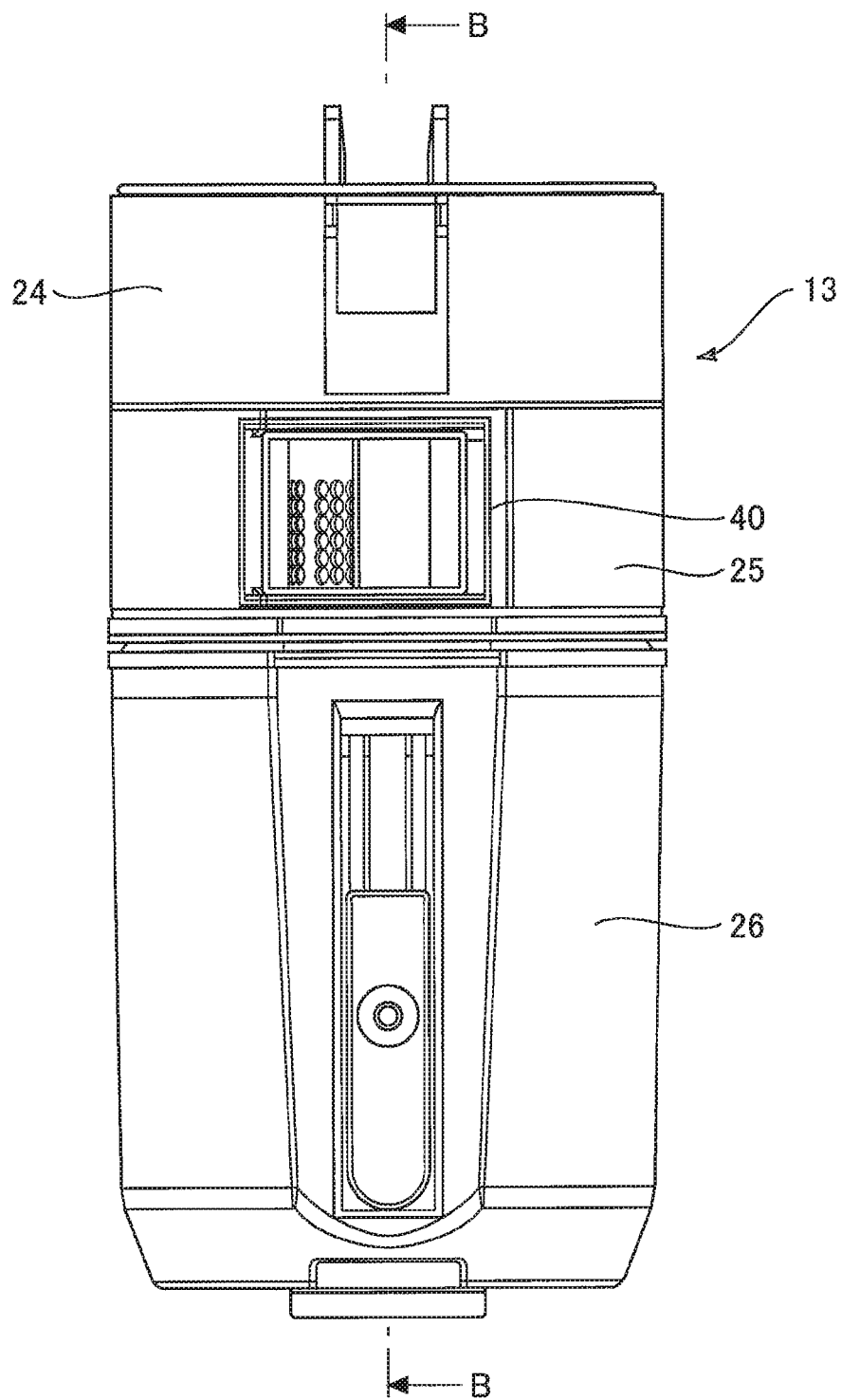
FIG. 5 is a front view of the dust collection unit of the electric vacuum cleaner relating to Embodiment 1 of the present invention.
Figure 6:
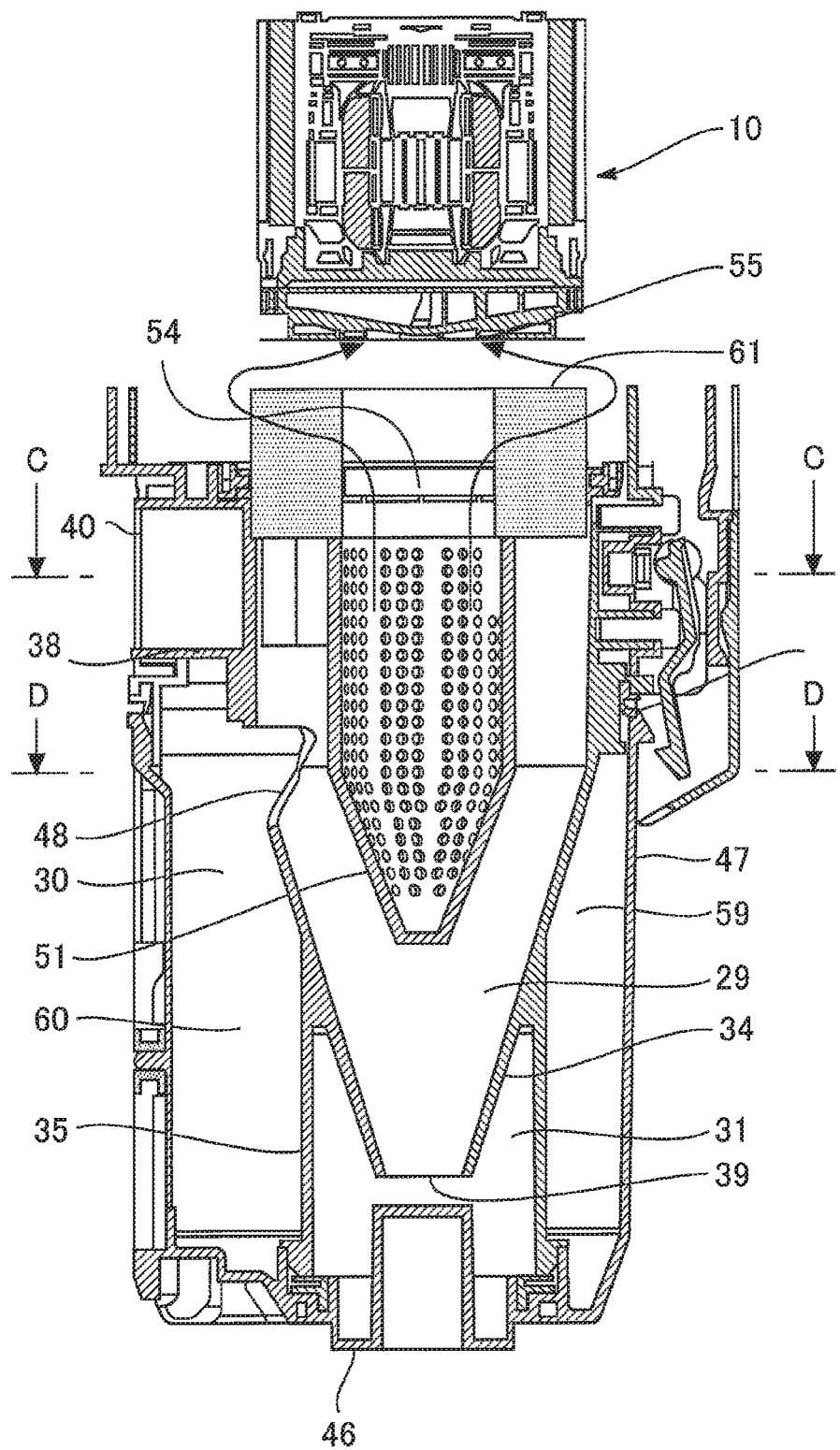
FIG. 6 is a B-B cross-sectional view of the dust collection unit illustrated in FIG. 5 together with an electric blower.
Figure 7:
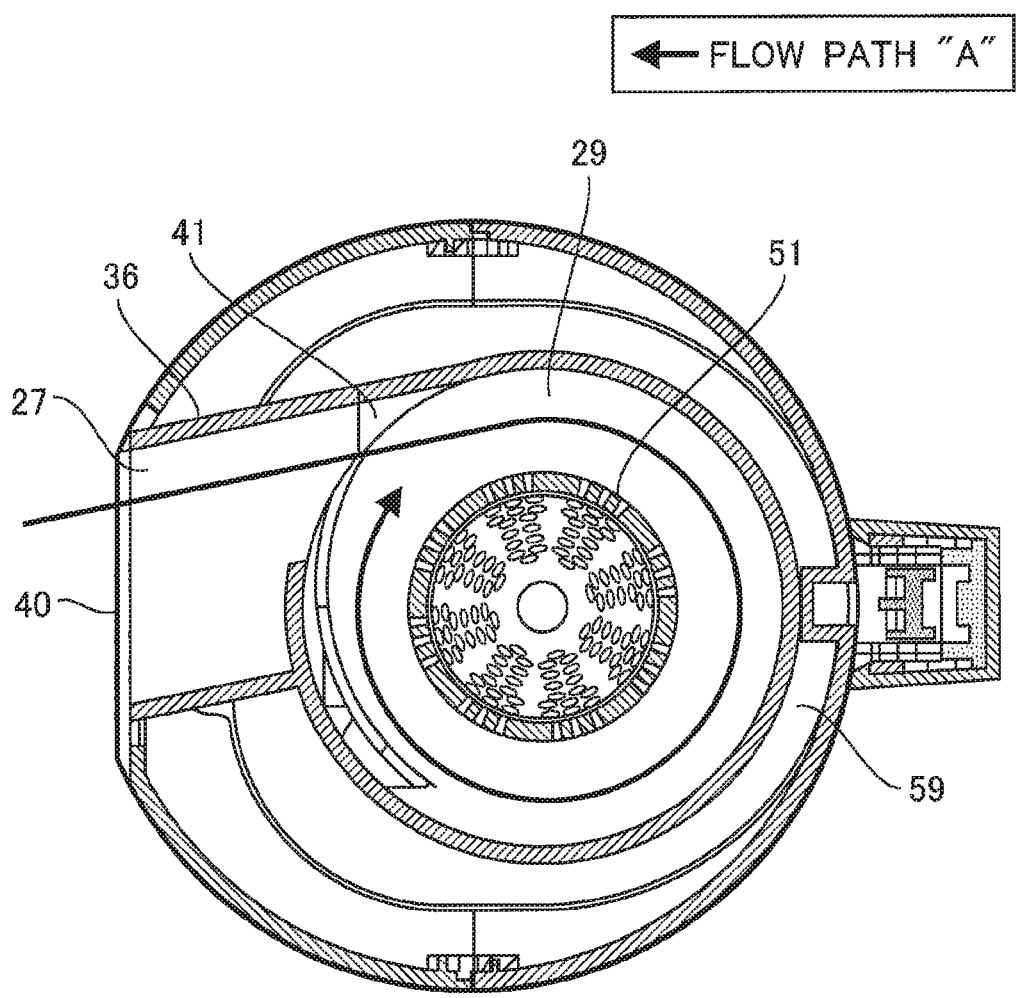
FIG. 7 is a C-C cross-sectional view of the dust collection unit illustrated in FIG. 6.
Figure 8:
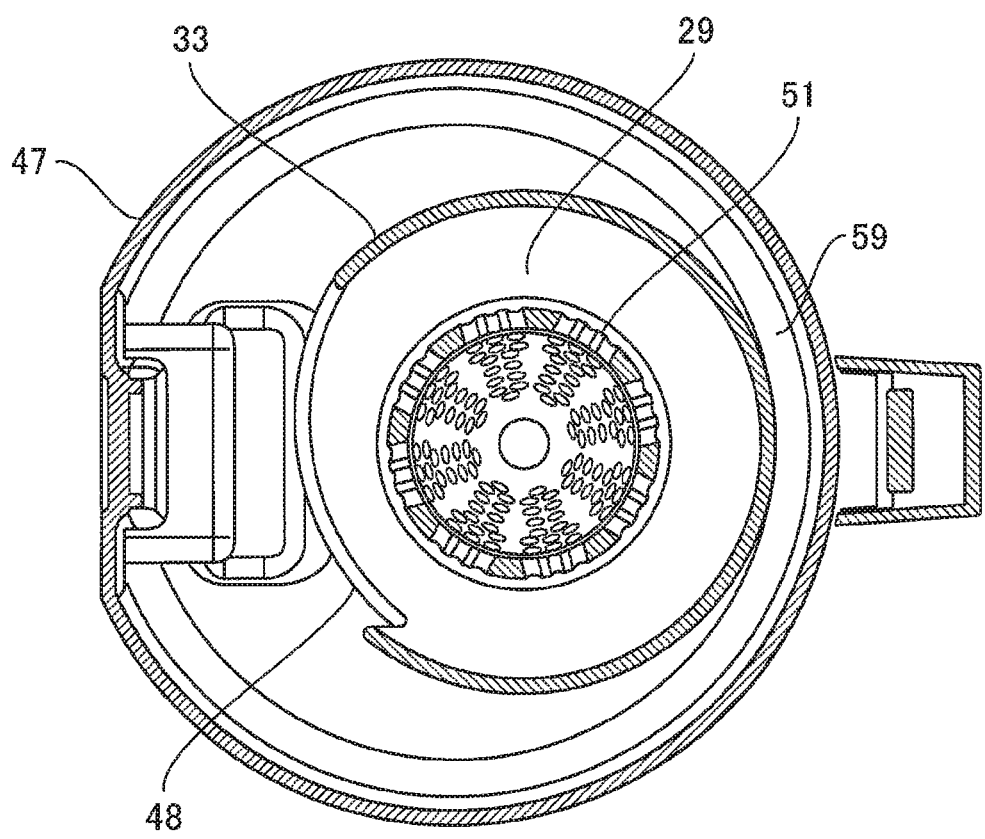
FIG. 8 is a D-D cross-sectional view of the dust collection unit illustrated in FIG. 6.
Figure 9:
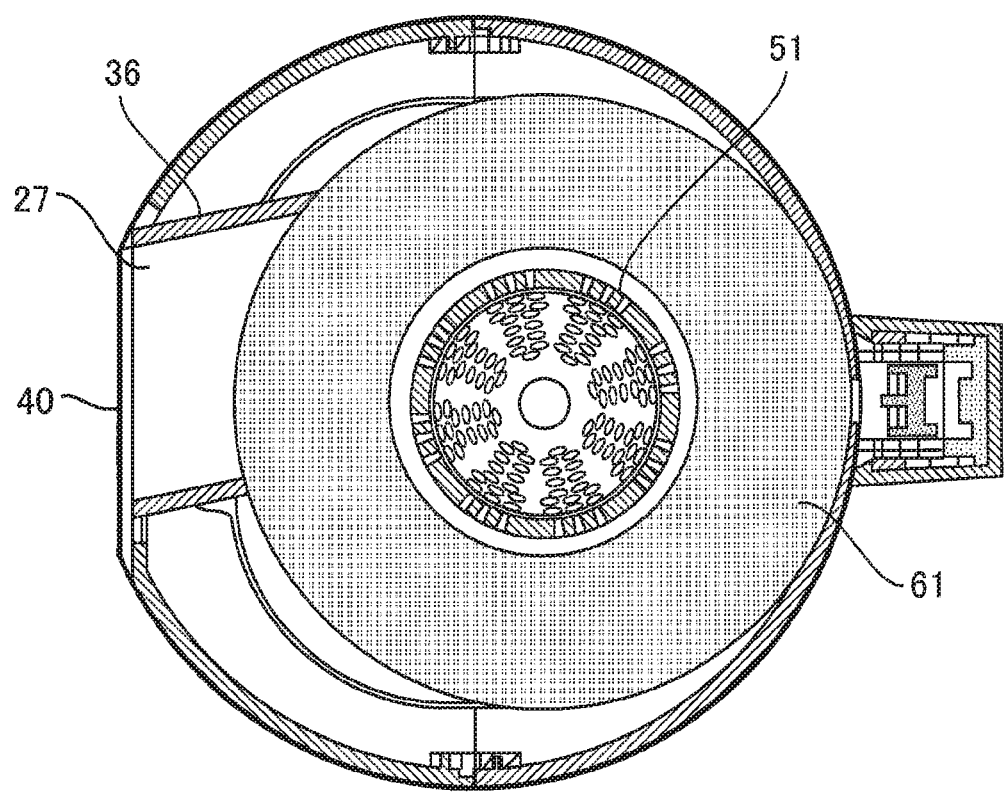
FIG. 9 is a top perspective view of the dust collection unit illustrated in FIG. 6.
Figure 10:
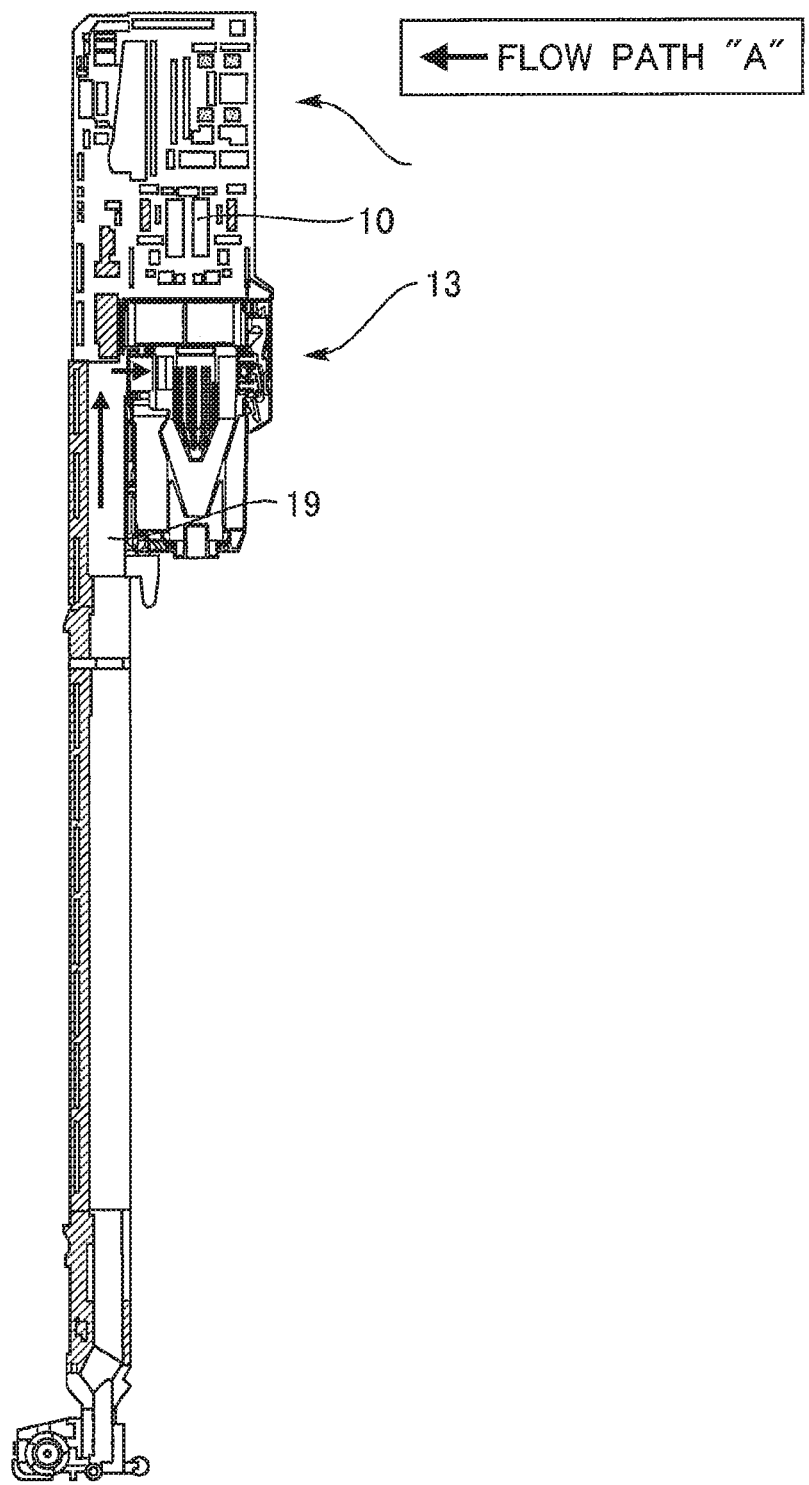
FIG. 10 is a A-A cross-sectional view illustrating an air duct of the electric vacuum cleaner illustrated in FIG. 3.

FIGS. 1 to 10 relate to Embodiment 1 of the present invention. FIG. 1 is a perspective view of an electric vacuum cleaner, FIG. 2 is a perspective view of the electric vacuum cleaner, illustrating a state where a dust collection unit is removed from a housing unit, FIG. 3 is a rear view of the electric vacuum cleaner, illustrating a state where the dust collection unit is removed from the housing unit, FIG. 4 is a A-A cross-sectional view of the housing unit from which the dust collection unit is removed as illustrated in FIG. 3, FIG. 5 is a front view of the dust collection unit of the electric vacuum cleaner, FIG. 6 is a B-B cross-sectional view of the dust collection unit illustrated in FIG. 5 together with an electric blower, FIG. 7 is a C-C cross-sectional view of the dust collection unit illustrated in FIG. 6, FIG. 8 is a D-D cross-sectional view of the dust collection unit illustrated in FIG. 6, FIG. 9 is a top perspective view of the dust collection unit illustrated in FIG. 6, and FIG. 10 is a A-A cross-sectional view illustrating an air duct of the electric vacuum cleaner illustrated in FIG. 3.

Here, description will be given on the case where an electric vacuum cleaner 1 is a cordless vertical electric vacuum cleaner, as an example. FIGS. 1 to 4 illustrate a state where the electric vacuum cleaner 1 is in an upright state. In the below description, up and down are defined on the basis of the state where the electric vacuum cleaner 1 is in an upright state.

As illustrated in FIG. 1, the electric vacuum cleaner 1 includes a suction tool 2, a connection pipe 3, a suction pipe 4, and a cleaner body 6. The suction tool 2 is used to suck trash (dust) on the cleaned surface such as a floor, together with the air. The suction tool 2 has an opening (suction port), formed downward, in the lower face thereof. The suction tool 2 sucks trash from the opening, together with the air. The suction tool 2 has, in the longitudinally center portion thereof, a connecting portion for discharging the air including the sucked dust (dust containing air).

The connection pipe 3 is formed of a straight member in a hollow cylindrical shape. An end portion of one side (intake side) of the connection pipe 3 is connected to the connecting portion of the suction tool 2. The suction pipe 4 is formed of a straight member in a hollow cylindrical shape. An end portion of one side (intake side) of the suction pipe 4 is connected to the other end (discharge side) of the connection pipe 3. The connection pipe 3 is detachably mounted on the suction tool 2 and the suction pipe 4.

The suction pipe 4 has a handle 7 on the upper side thereof. The handle 7 is to be held by a user of the electric vacuum cleaner 1 for operating it. The handle 7 has an operation switch 8 for operating driving of the electric vacuum cleaner 1 by the user. The connection pipe 3, the suction pipe 4, and the handle 7 are continuously formed in the appearance.

The cleaner body 6 is used for separating trash and dust from the air taken inside, and discharging the air from which trash and dust are removed. In the below description, the air containing trash and dust is called "dust containing air". Further, the air from which trash and dust are removed is called "clean air". The clean air discharged from the cleaner body 6 is returned to the inside of the room, for example.

The cleaner body 6 includes a housing unit 12 and a dust collection unit 13. The housing unit 12 is in a cylindrical shape, for example. The housing unit 12 is a molded item, for example. The handle 7 is provided on the front side of the housing unit 12. The dust collection unit 13 is positioned on the rear side of the suction pipe 4. The dust collection unit 13 is positioned below the housing unit 12. The dust collection unit 13 is in a cylindrical shape having the same diameter as that of the housing unit 12, for example. The dust collection unit 13 and the housing unit 12 are coaxially provided. Accordingly, the outer peripheral face of the dust collection unit 13 continues to the outer peripheral face of the housing unit 12 in the appearance. This means that the entire appearance of the cleaner body 6 is in a cylindrical shape, for example.

The suction pipe 4 and the connection pipe 3 are provided at a position overlapping the handle 7 when viewed from above. The suction pipe 4 and the connection pipe 3 are positioned at the front of the cleaner body 6. Accordingly, the axis along the longitudinal direction of the suction pipe 4 and the connection pipe 3 is shifted from the axis of the cleaner body 6 in a cylindrical shape.

The dust collection unit 13 is detachably mounted on the cleaner body 6. FIG. 1 illustrates a state where the dust collection unit 13 is mounted on the cleaner body 6. Meanwhile, FIGS. 2 to 4 illustrate a state where the dust collection unit 13 is removed from the cleaner body 6.

As illustrated in FIGS. 2 to 4, the rear face on the other side (discharge side) of the suction pipe 4 has a first connection port 20. As illustrated in FIG. 4, in a state where the suction tool 2, the connection pipe 3, and the suction pipe 4 are connected, the insides of the suction tool 2, the connection pipe 3, and the suction pipe 4 continue in series. In this way, by the suction tool 2, the connection pipe 3, and the suction pipe 4, an intake air duct 19 extending from the intake port of the suction tool 2 to the first connection port 20 of the suction pipe 4 is formed.

As illustrated in FIG. 1, the front face of the dust collection unit 13 has a unit inflow port 40. The unit inflow port 40 communicates with the inside of the dust collection unit 13. In a state where the dust collection unit 13 is mounted on the cleaner body 6, the unit inflow port 40 is positioned in a lower portion of the front face of the cleaner body 6. In this state, the first connection port 20 of the suction pipe 4 and the unit inflow port 40 of the dust collection unit 13 are closely joined, and the intake air duct 19 communicates with the unit inflow port 40. This means that the intake air duct 19 is an air duct extending from the outside to the inside of the dust collection unit 13 of the cleaner body 6.

The dust collection unit 13 is used for separating trash and dust from the dust containing air, and temporarily storing the separated trash and dust. The dust collection unit 13 whirls the dust containing air therein to thereby separate trash and dust from the air by the centrifugal force. This means that the dust collection unit 13 is a cyclone separator having a cyclone separating function.

The housing unit 12 includes a container 14 and a discharge air duct forming unit 17. The discharge air duct forming unit 17 forms a discharge air duct 21 extending from the inside to the outside of the housing unit 12. The discharge air duct 21 is an air duct for guiding the air discharged from the dust collection unit 13 to a discharge port not illustrated.

In the housing unit 12, the container 14 and the discharge air duct forming unit 17 are vertically arranged. The container 14 is positioned below the discharge air duct forming unit 17. The container 14 is formed of a molded item, for example. A lower face portion of the housing unit 12, that is, the lower surface of the container 14, has a second connection port 22.

Further, an upper face portion of the dust collection unit. 13 has an opening as a unit outflow port. The unit outflow port communicates with the inside of the dust collection unit 13. In a state where the dust collection unit. 13 is mounted on the cleaner body 6, the unit outflow port of the dust collection unit 13 and the second connection port 22 of the housing unit 12 are closely joined, and the inside of the dust collection unit 13 communicates with the inside of the housing unit 12.

The container 14 contains an electric blower 10 therein. The electric blower 10 is used for generating an air flow in the intake air duct 19, inside the dust collection unit 13 (particularly, inside a whirling chamber 29 described below), and in the discharge air duct 21. The electric blower 10 is electrically connected to a secondary battery not illustrated, for example. The secondary battery is contained inside the electric blower 10, for example. The electric blower 10 is driven by the electric power supplied from the secondary battery.

The electric blower 10 performs a preset sucking action according to the operation performed on the operation switch 8. When the electric blower 10 performs a sucking action, trash on the floor is sucked into the suction tool 2 along with the air. The dust containing air sucked into the suction tool 2 is sent to the dust collection unit 13 of the cleaner body 6 through the intake air duct 19.

The air, in which trash and dust are separated in the dust collection unit 13 and which is cleaned, is discharged from the dust collection unit 13. The clean air discharged from the dust collection unit 13 passes through the electric blower 10. The clean air that passed through the electric blower 10 advances the discharge air duct 21, and is discharged from the discharge port to the outside of the cleaner body 6.

Next, the dust collection unit 13 will be further described with reference to FIGS. 5 to 9. Hereinafter, in the description related to the dust collection unit 13, up and down are defined on the basis of the orientation illustrated in FIG. 5. The dust collection unit 13 includes a discharge unit case 24, an inflow unit case 25, and a dust collection unit case 26. The discharge unit case 24, the inflow unit case 25, and the dust collection unit case 26 are arranged from the top in the presented order. The inflow unit case 25 has the unit inflow port 40 described above.

Each of the discharge unit case 24, the inflow unit case 25, and the dust collection unit case 26 is formed of a molded item, for example. In particular, a resin material having high transparency is used for the dust collection unit case 26 so that the inside thereof can be seen. Each of the discharge unit case 24, the inflow unit case 25, and the dust collection unit case 26 is configured so as to be able to be disassembled from the state illustrated in FIG. 5 and to be assembled to the state illustrated in FIG. 5 by a preset operation. (such as an operation performed on the lock mechanism, for example). It is also possible to remove only the dust collection unit case 26 from the state illustrated in FIG. 5.

When any one or a plurality of the discharge unit case 24, the inflow unit case 25, and the dust collection unit case 26 are appropriately arranged, an inflow air duct 27, the whirling chamber 29, a zero-order dust collection chamber 30, a primary dust collection chamber 31, and an outflow air duct not illustrated are formed in the dust collection unit 13. The inflow unit case 25 includes a cylindrical portion 33, a conic portion 34, a partition wall portion 35, an inflow pipe 36, and a connecting portion 38.

The cylindrical portion 33 is in a hollow cylindrical shape. The cylindrical portion 33 is positioned such that the center axis faces the vertical direction. The conic portion 34 is in a truncated hollow conic shape. The conic portion 34 is positioned vertically such that the center axis thereof coincides with the center axis of the cylindrical portion 33. The conic portion 34 is provided such that the upper end thereof is connected to the lower end portion of the cylindrical portion 33 so as to extend downward from the lower end portion of the cylindrical portion 3 such that the diameter thereof is decreased downward. Accordingly, the lower end portion of the conic portion 34 is opened to the downward direction center axis direction). The opening formed in the lower end portion of the conic portion 34 is a primary opening 39.

A series of space configured of the inner space of the cylindrical portion 33 and the inner space of the conic portion 34 constitutes the whirling chamber 29. The whirling chamber 29 is a space in which the dust containing air is whirled about the center axis to thereby separate the dust from the dust containing air. The center axes of the cylindrical portion 33 and the conic portion 34 of the whirling chamber 29 are positioned along the vertical direction. Therefore, the center axis of the swirl of the air (hereinafter also referred to as "swirl center axis") in the whirling chamber 29 is also positioned along the vertical direction. It should be noted that a side wall forming whirling chamber 29 has a cylindrical and conic surface shape in the entire area of the axial length.

The partition wall portion 35 is in a cylindrical shape having a smaller diameter than that of the cylindrical portion 33. The partition wall portion 35 is provided to extend downward from an intermediate portion of the outer face of the conic portion 34. The lower side of the conic portion 34 including the primary opening 39 is positioned in the inner space of the partition wall portion 35. In the space formed inside the partition wall portion 35, the portion other than the conic portion 34 forms the primary dust collection chamber 31. The primary dust collection chamber 31 communicates with the whirling chamber 29 via the primary opening 39. In the whirling chamber 29, part of the trash separated from the dust containing air drops into the primary dust collection chamber 31 through the primary opening 39, and captured. The primary dust collection chamber 31 is positioned to cover the lower part of the conic portion 34 (lower part of the whirling chamber 29) and surround the periphery thereof.

The inflow pipe 36 is used for guiding the dust containing air that passed through the intake air duct 19, to the inside of the cylindrical portion 33 (whirling chamber 29). The inner space of the inflow pipe 36 forms the inflow air duct 27. The inflow air duct 27 is an air duct for allowing the dust containing air to flow from the intake air duct 19 into the whirling chamber 29. The inflow pipe 36 is in a square cylindrical shape, for example, and is connected to the cylindrical portion 33. The inflow pipe 36 is configured such that one end is opened to the outside and the other end is opened to the inside of the cylindrical portion 33. The one end of the inflow pipe 36 forms the unit inflow port 40 for taking the dust containing air into the dust collection unit 13. The other end of the inflow pipe 36 forms a main flow inlet 41 for taking the dust containing air that passed through the inflow air duct 27, into the inside of the cylindrical portion 33 (whirling chamber 29).

The inflow pipe 36 is connected to an upper portion of the cylindrical portion 33. As such, the main flow inlet 41 is formed in an upper portion of the cylindrical portion 33 (the uppermost portion of the side wall forming the whirling chamber 29). The inflow pipe 36 is formed of a linear member. The inflow pipe 36 is positioned such that the axis thereof is orthogonal to the center axis of the cylindrical portion 33, in a tangential direction of the cylindrical portion 33.

The connecting portion 38 is provided to protrude outward from the cylindrical portion 33. The connecting portion 38 is in a ring shape as a whole. The connecting portion 38 is positioned at an almost intermediate height of the cylindrical portion 33.

The dust collection unit case 26 is formed such that the axial length is longer than the diameter. The dust collection unit case 26 includes a bottom part 46 and an outer wall part 47. The bottom part 46 is in an almost circular shape as a whole. The cuter wall part 47 is in an almost cylindrical shape having a larger outer shape than that of the cylindrical portion 33.

The outer wall part 47 is provided to extend upward from an edge portion of the bottom part 46. This means that the outer wall part 47 and the bottom part 46 form an almost cylindrical member with one side (lower side) being closed. The outer wall part 47 is positioned outside the partition wall portion 35. The lower end of the partition wall portion 35 is in contact with the bottom part 46. As such, in the dust collection unit case 26, two spaces divided by the partition wall portion 35 are formed therein.

An upper end portion of the outer wall part 47 is brought into contact with an edge portion of the connecting portion 35 from the bottom. A series of spaces in a cylindrical shape formed between the outer wall part 47 and the partition wall portion 35 and between the outer wall part 47 and a part of each of the cylindrical portion 33 and the conic portion 34 forms zero-order dust collection chamber 30. In the series of spaces, the upper side is closed with the connecting portion 38 and the lower side is closed with the bottom part 46. Further, the zero-order dust collection chamber 30 is positioned to surround the lower portion of the cylindrical portion 33 and the conic portion 34 (that is, almost all portion of the whirling chamber 29) and also surround the periphery of the primary dust collection chamber 31.

A side wall forming the whirling chamber 29 has a zero-order opening 48. The whirling chamber 29 communicates with the zero-order dust collection chamber 30 via the zero-order opening 48. The zero-order opening 48 is formed at a position lower than the main flow inlet 41 (downstream side) and a position higher than the primary opening 39 (upstream side). For example, the zero-order opening 48 is provided from the lower end portion of the cylindrical portion 33 to the upper end portion of the conic portion 34, and is positioned lower than the connecting portion 38. With this configuration, the zero-order opening 48 is positioned near the topmost portion of the zero-order dust collection chamber 30, whereby the zero-order dust collection chamber 30 is provided to extend downward from the zero-order opening 48.

The dust collection unit case 26 and the inflow unit case 25 are combined such that the center axis of the cylindrical portion 33 of the inflow unit case 25 is shifted from the center axis of the cylinder of the dust collection unit case 26 to be in a biased position. Accordingly, in the zero-order dust collection chamber 30, a narrow portion 59 and a wide portion 60 are formed. The narrow portion 59 is a portion in which the distance between the outer wall of the cylindrical portion 33 and the inner wall of the outer wall part 47 is relatively narrower than that of the wide portion 60. The wide portion 60 is a portion in which the distance between the outer wall of the cylindrical portion 33 and the inner wall of the outer wall part 47 is relatively wider than the narrow portion 59.

The discharge unit case 24 is in a hollow cylindrical shape. When the discharge unit case 24 is positioned appropriately with respect to the inflow unit case 25, the bottom part of the discharge unit case 24 is positioned to close the top of the cylindrical portion 33. This means that the upper wall of the whirling chamber 29 is formed by the bottom part of the discharge unit case 24. The bottom part of the discharge unit case 24, that is, the upper wall of the whirling chamber 29, has a discharge port 54. The discharge port 54 is an opening for discharging the air inside the whirling chamber 29.

The discharge unit case 24 includes a discharge pipe 51. The upper end side of the discharge pipe 51 communicates with the discharge port 54. The lower end side of the discharge pipe 51 protrudes downward from the bottom part of the discharge unit case 24. When the discharge unit case 24 is appropriately mounted on the inflow unit case 25, the discharge pipe 51 is positioned to protrude from the upper wall of the whirling chamber 29 to the inside of the whirling chamber 29.

In the discharge pipe 51, a portion above the preset intermediate portion is in a cylindrical shape. The portion lower than the intermediate position of the discharge pipe 51 is in a hollow conic shape having a diameter decreased in the downward direction. The discharge pipe 51 is positioned vertically such that the center axis thereof coincides with the center axis of the cylindrical portion 33. This means that the discharge pipe 51 is provided inside the whirling chamber 29 along the whirling center axis of the whirling chamber 29.

The discharge pipe 51 has a plurality of micropores. Through the micropores, the air inside the whirling chamber 29 enters the discharge pipe 51, and is discharged to the outside of the whirling chamber 29 from the discharge port 54 via the discharge pipe 51.

The dust collection unit 13 includes a filter unit 61. The filter unit 61 will be described with reference to FIGS. 6 and 9. FIG. 9 illustrates the dust collection unit 13 when seen from the above. This means that FIG. 9 illustrates an arrangement of respective units in a horizontal projection plane. As described above, the whirling center axis of the whirling chamber 29 is positioned along the vertical direction. Accordingly, in other words, FIG. 9 illustrates an arrangement of respective units on a projection plane in which the whirling center axis serves as a normal line, that is, a projection plane vertical to the whirling center axis.

As illustrated in FIG. 6, the filter unit 61 is provided downstream of the discharge port 54 of the whirling chamber 29. Further, as illustrated in FIG. 9, the filter unit 61 is annularly positioned on the projection plane in Embodiment 1. Further, the filter unit 61 is positioned outside the discharge pipe 51 on the projection plane, in more detail, outside the outer periphery of the discharge pipe 51 along the outer periphery of the discharge pure 51.

Further, as illustrated in FIG. 6, a portion of the filter unit 61, which is on the lower side from the preset intermediate position, is positioned inside the whirling chamber 29. The remaining portion of the filter unit 61, which is on the upper side from the preset intermediate position, is positioned outside the whirling chamber 29. The filter unit 61 has a pleated structure having a plurality of fold peaks arranged along the whirling center axis.

When the dust collection unit 13 is appropriately mounted on the housing unit 12, the upper face of the filter unit 61 and the lower face of the dust collection unit 13 are mated. Then, as described above, the unit inflow port 40 is connected to the first connection port 20. The opening in the upper face of the dust collection unit 13, that is, the unit outflow port, is connected to the second connection port 22 of the housing unit 12. In this state, the electric blower 10 that generates an air flow passing through the whirling chamber 29 is positioned downstream of the filter unit 61. In this state, a blower suction port 55 of the electric blower 10 is positioned to face the lower side, that is, the filter unit 61 side.

In the electric vacuum cleaner 1 having the dust collection unit 13 configured as described above, when a sucking action of the electric blower 10 is started, the dust containing air passes through the intake air duct 19 and reaches the first connection port 20, as described above. The dust containing air sequentially passes through the first connection port 20 and the unit inflow port 40, and flows into the inflow pipe 36, that is, the inflow air duct 27. The dust containing air that flowed into the inflow air duct 27 advances in the axial direction of the inflow pipe 36, passes through the main flow inlet 41, and flows to the inside (whirling chamber 29) of the cylindrical portion 33.

The dust containing air that passed through the main flow inlet 41 flows into the whirling chamber 29 from the tangent direction along the inner peripheral face of the cylindrical portion 33 (inner wall face of the whirling chamber 29). The dust containing air taken from the main flow inlet 41 into the whirling chamber 29 forms a swirling air flow swirling about the whirling center axis in a preset direction along the side wall in the whirling chamber 29. The swirling air flow flows downward by the flow path structure thereof and the gravity, while forming a forced vortex region near the center axis and a free vortex region outside thereof. The flow path described above is illustrated by a solid line arrow as a flow path "a" in FIGS. 7 and 10.

On the trash included in the swirling air flow (the air in the whirling chamber 29), a centrifugal force is acted. For example, trash having a relatively large volume such as fiber dust and hairs (hereinafter, such trash is referred to as "trash $\alpha$") drops in the whirling chamber 29 while being pressed to the inner peripheral face of the cylindrical portion 33 (inner wall face of the whirling chamber 29) by the centrifugal force. Further, part of the air in the whirling chamber 29 flows into the zero-order dust collection chamber 30 by the centrifugal force.

When the trash $\alpha$ reaches the height of the zero-order opening 48, it is separated from the swirling air flow, and is sent to the zero-order dust collection chamber 30 through the zero-order opening 48. The trash $\alpha$ entering the zero-order dust collection chamber 30 from the zero-order opening 48 drops in the zero-order dust collection chamber 30 while moving in the same direction as the air swirling direction in the whirling chamber 29. The trash $\alpha$ is accumulated from the lowermost portion of the narrow portion 59 of the zero-order dust collection chamber 30 in a direction opposite to the air swirling direction in the whirling chamber 29, and is captured.

The trash not entering the zero-order dust collection chamber 30 from the zero-order opening 48 advances downward while swirling in the whirling chamber 29 along with the air flow in the whirling chamber 29. The trash having a relatively small volume such as sand and fine fiber dust (hereinafter, such trash is referred to as "trash $\beta$") passes through the primary opening 39. Then, the trash $\beta$ drops into the primary dust collection chamber 31 and is captured.

When the air flow swirling in the whirling chamber 29 reaches the lowermost portion of the whirling chamber 29, the advancing direction is changed to the upward direction, and the air flow moves upward along the center axis of the whirling chamber 29. In the air forming the upward air flow, the trash $\alpha$ and the trash $\beta$ have been removed. The air flow in which the trash $\alpha$ and the trash $\beta$ have been removed (clean air) enters the discharge pipe 51. Then, the air from the discharge pipe 51 passes through the discharge port 54, and is discharged to the outside of the whirling chamber 29.

The air discharged from the discharge port 54 of the whirling chamber 29 next passes through the filter unit 61. At that time, the air passes from the inner peripheral side of the ring of the filter unit 61 to the outer peripheral side of the filter unit 61. When the air passes through the filter unit 61, trash that is finer than the trash $\beta$ and the like, which are not completely removed in the whirling chamber 29, is filtered out by the filter unit 61 and is removed from the air.

The air that passed through the whirling chamber 29 and the filter unit 61 and is cleaned sequentially passes through the unit outflow port and the second connection port 22, and enters the housing unit 12. Then, the clean air passes through the electric blower 10 and is sent to the discharge air duct 21.

In the dust collection unit 13 (electric vacuum cleaner 1) having the configuration described above, it is possible to improve the separation efficiency with a small-sized configuration. Further, as the electric blower 10 performs a sucking action, the trash $\alpha$ is collected in the zero-order dust collection chamber 30, and the trash $\beta$ is collected in the primary dust collection chamber 31, as described above. The trash $\alpha$ and the trash $\beta$ can be easily thrown away by removing the dust collection unit case 26 from the dust collection unit 13.

Further, the primary dust collection chamber 31 extends to a space outside the side wall of the conic portion 34 covered with the partition wall portion 35. Accordingly, a space above the primary dust collection chamber 31 can be used for capturing the trash. Therefore, it is possible to realize size reduction by suppressing the height of the dust collection unit 13, and to secure the dust collection volume. Further, as the side wall of the whirling chamber 29 is opened to have the zero-order opening 48, and large trash is captured in the zero-order dust collection chamber 30 via the zero-order opening 48, there is no need to provide another separation device for capturing large trash. Accordingly, it is possible to reduce the size of the dust collection unit 13, and also reduce the size of the cleaner body 6 and the electric vacuum cleaner 1.

Further, by providing the filter unit 61 downstream of the discharge port 54 of the whirling chamber 29, it is possible to further clean the air discharged from the electric vacuum cleaner 1. In that case, by positioning the filter unit 61 outside the discharge pipe 51 on a projection plane vertical to the whirling center axis, it is possible to position the filter unit 61 by efficiently utilizing the space in the air duct of the air discharged from the whirling chamber 29.

This means that it is possible to enlarge the passing area of the filter unit 61 in the limited installation space, to improve the dust collection efficiency and reduce the pressure loss in the filter unit 61, and to reduce the size of the cleaner body 6. By reducing the size of the cleaner body 6, it is also possible to reduce the weight of the cleaner body 6, and to improve the operability during cleaning, that is, easiness of handling, without causing a collision of the cleaner body 6 even in a small cleaning space.

Further, by positioning a portion of the filter unit 61 in the whirling chamber 29 and positioning the remaining portion of the filter unit 61 outside the whirling chamber 29, it is possible to further reduce the size of the entire device by further reducing the dimension, particularly the vertical dimension, required for installing the filter unit 61.

In addition, by positioning the filter unit 61 in an annular shape on the projection plane, it is possible to improve the efficiency of the installation space of the filter unit 61 by utilizing the shape characteristics that it is in a circular shape for whirling the air, of the cyclone separator. Moreover, as the filter unit 61 has a pleated structure having a plurality of fold peaks in which the fold lines are arranged along the whirling center axis, it is possible to further increase the passing area of the filter unit 61, to thereby further improve the dust collection efficiency and reduce the pressure loss in the filter unit 61.

It should be noted that while a codeless vertical electric vacuum cleaner has been described as an example in this embodiment, the electric vacuum cleaner 1 is not limited to this type. Any other type such as a canister type is also acceptable, if the cleaner is a cyclone-type electric vacuum cleaner in which the air is whirled in the whirling chamber 29 and dust is separated from the air by the inertial force.

Embodiment 2

Figure 11:
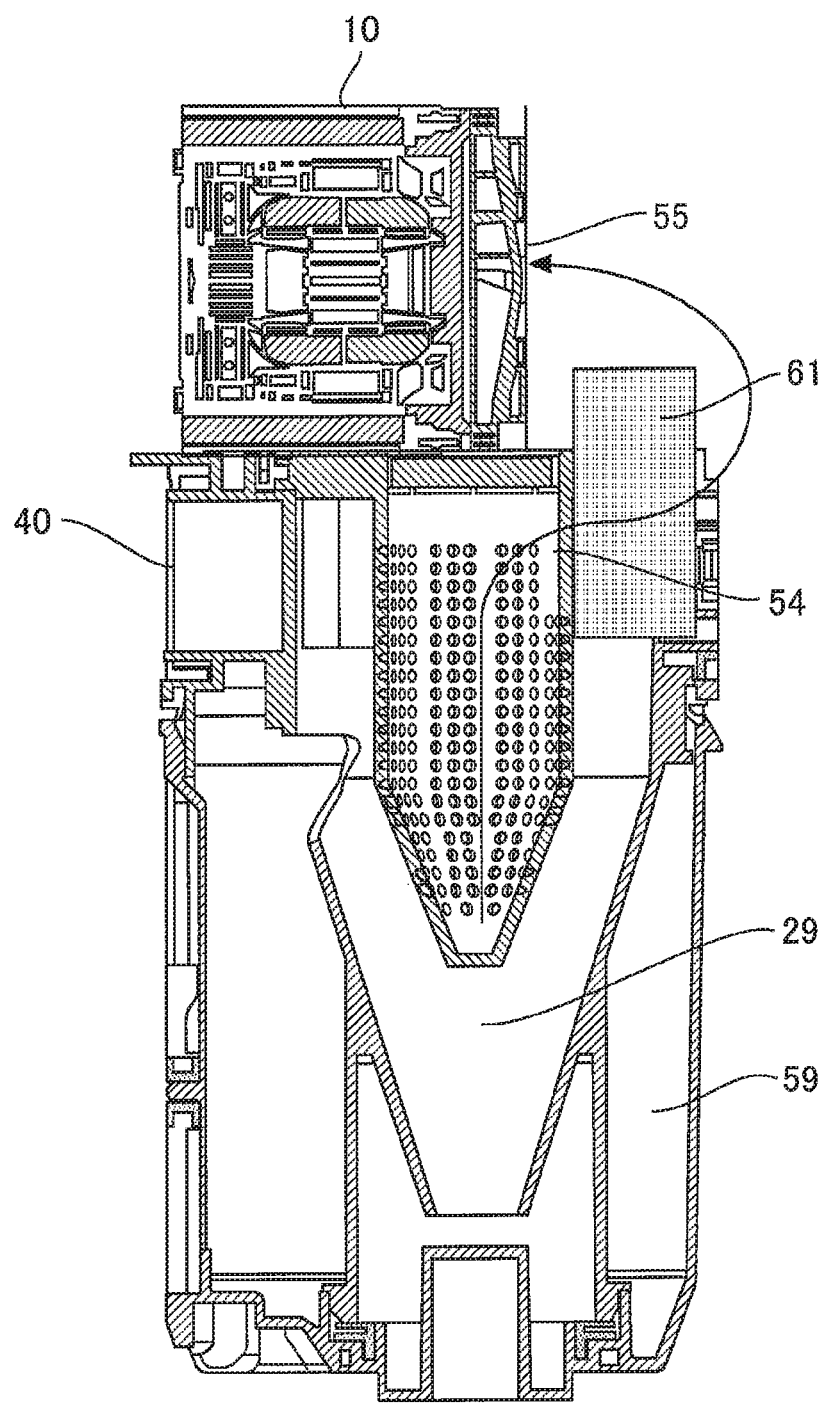
FIG. 11 is a cross-sectional view corresponding to FIG. 6 illustrating a dust collection unit, a filter unit, and an electric blower relating to Embodiment 2 of the present invention.
Figure 12:
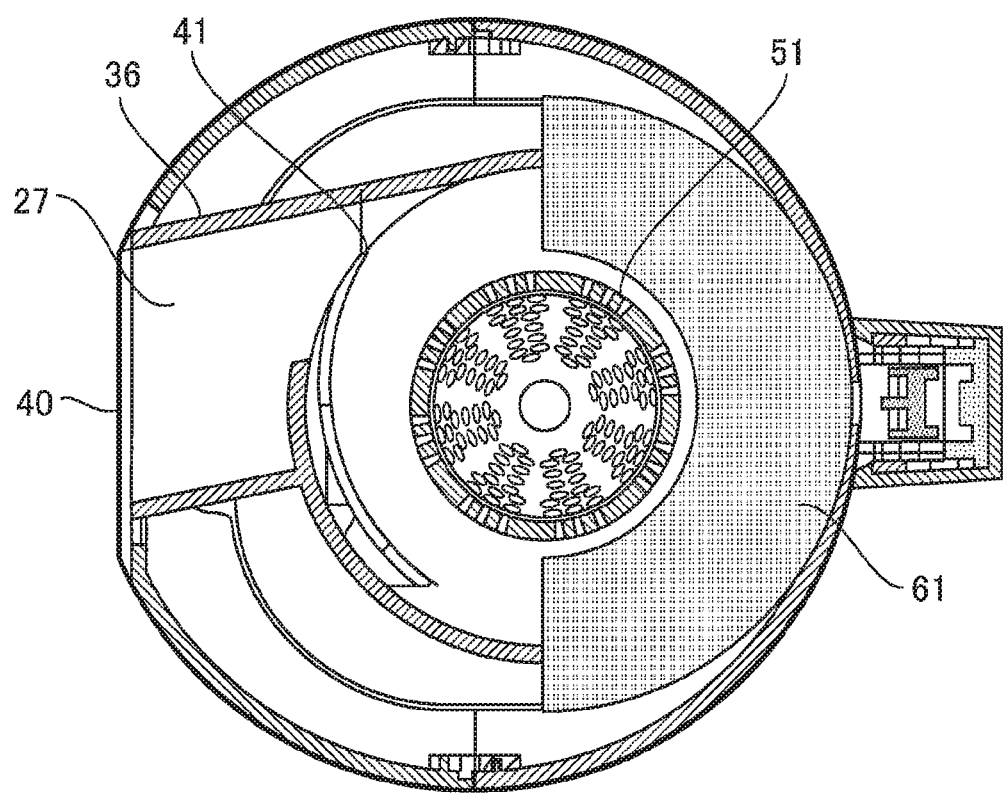
FIG. 12 is a top perspective view corresponding to FIG. 9 illustrating the dust collection unit and the filter unit relating to Embodiment 2 of the present invention.

FIGS. 11 and 12 relate to Embodiment 2 of the present invention. FIG. 11 is a cross-sectional view corresponding to FIG. 6 illustrating a dust collection unit, a filter unit, and an electric blower, and FIG. 12 is a top perspective view corresponding to FIG. 9 illustrating the dust collection unit and the filter unit.

Embodiment 2 described here is configured such that the electric blower is adjacently positioned beside the filter unit in the configuration of Embodiment 1 described above. Regarding an electric vacuum cleaner according to Embodiment 2, description will be given below mainly on the difference from Embodiment 1.

As illustrated in FIG. 11, the filter unit 61 is provided downstream of the discharge port 54 of the whirling chamber 29. In Embodiment 2, the filter unit 61 is positioned in a biased manner on the opposite side of the unit inflow port 40 in the dust collection unit 13, for example.

FIG. 12 illustrates an arrangement of respective units on a projection plane vertical to the whirling center axis of the whirling chamber 29, which is similar to FIG. 9 of Embodiment 1. As illustrated in FIG. 12, the filter unit 61 is positioned in an ark shape that is a part of an annular shape on the projection plane. Further, the filter unit 61 is positioned along the outer periphery of the discharge pipe 51 outside the discharge pipe 51 on the projection plane, similar to Embodiment 1.

Further, as illustrated in FIG. 11, a portion on the lower side of the filter unit 61 is positioned in the whirling chamber 29, and the remaining portion on the upper side is positioned outside the whirling chamber 29, similar to Embodiment 1. The filter unit 61 has a pleated structure having a plurality of fold peaks in which the fold lines are arranged along the whirling center axis.

The electric blower 10 is positioned downstream of the filter unit 61, similar to Embodiment 1. In Embodiment 2, the electric blower 10 is positioned so as to adjacent to the filter unit 61 on the projection plane. Here, the electric blower 10 is positioned on the unit inflow port 40 side when seen from the filter unit 61. Further, on the projection plane, the electric blower 10 is also positioned such that the blower suction port 55 faces the filter unit 61 side. This means that the blower suction port 55 is positioned to face in the horizontal direction rather than the vertical direction. It should be noted that in Embodiment 2, the electric blower 10 may be housed in either the dust collection unit 13 or the housing unit 12.

Further, in Embodiment 2, the discharge port 54 is formed in the side wall of the discharge pipe 51, rather than the bottom face of the discharge unit case 24, that is, the upper wall of the whirling chamber 29. Then, the portion of the filter unit 61, which is inside the whirling chamber 29, is positioned so as to be adjacent to the discharge port 54.

In the electric vacuum cleaner 1 configured as described above, the air entering the discharge pipe 51 from the whirling chamber 29 is discharged from the discharge port 54 formed in the side wall of the discharge pipe 51. The air discharged from the discharge port 54 passes from the inner peripheral side to the outer peripheral side of the ark of the filter unit 61. Then, the air that passed through the filter unit 61 and is cleaned moves toward the blower suction port 55.

The Other part of the configuration is the same as that of Embodiment 1. The detailed description thereof is omitted.

In the electric vacuum cleaner 1 configured as described above, the filter unit 61 can be positioned in the middle of the air duct running from the discharge port 54 of the whirling chamber 29 to the electric blower 10, and the electric blower 10 can be positioned so as to be adjacent to the upper edge of the whirling chamber 29. Accordingly, in addition to the same effect as that of Embodiment 1, it is also possible to further reduce the size of the cleaner body 6 by reducing the vertical dimension including the electric blower 10, the whirling chamber 29, and the filter unit 61.

Embodiment 3

Figure 13:
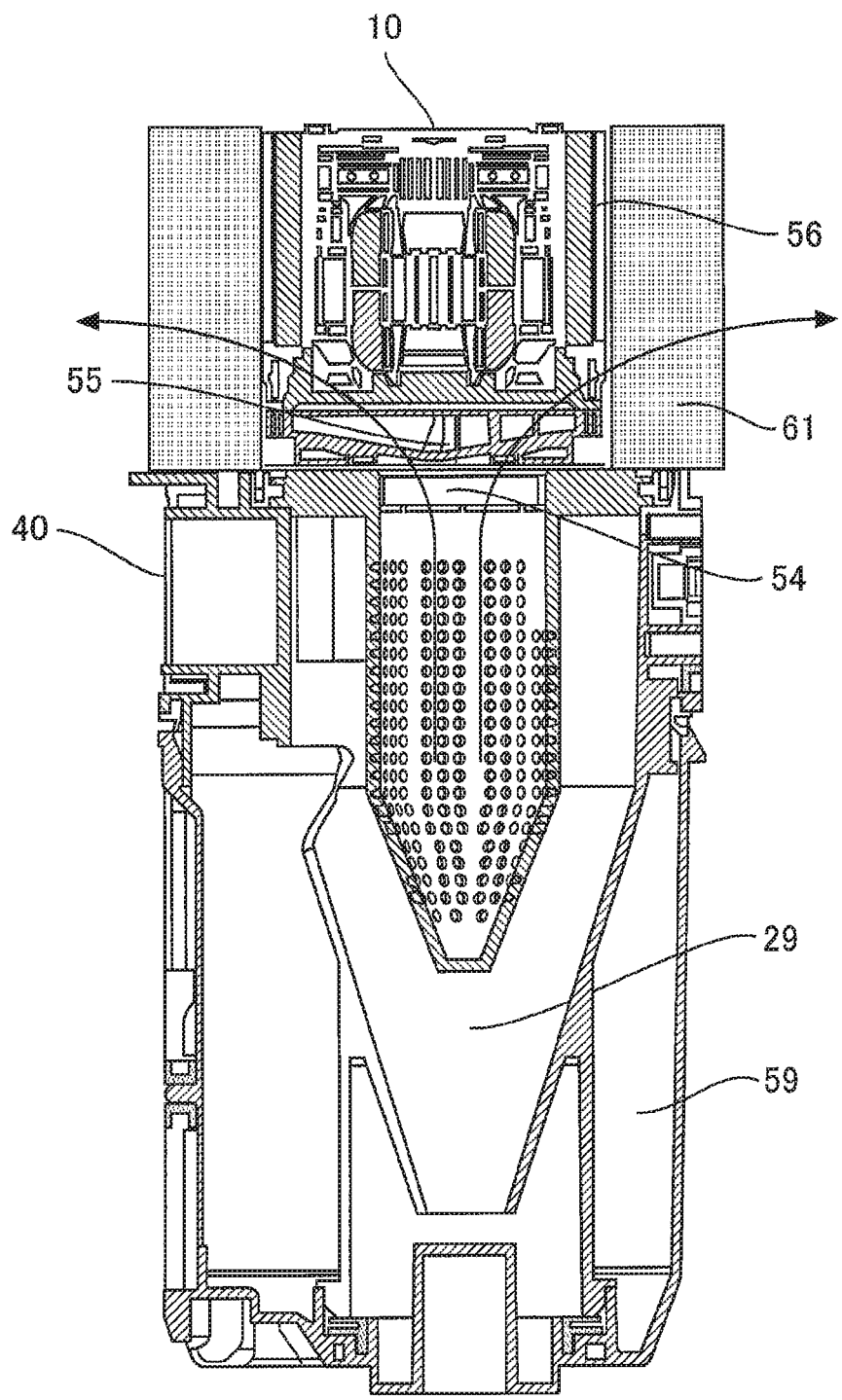
FIG. 13 is a cross-sectional view corresponding to FIG. 6 illustrating a dust collection unit, a filter unit, and an electric blower relating to Embodiment 3 of the present invention.
Figure 14:
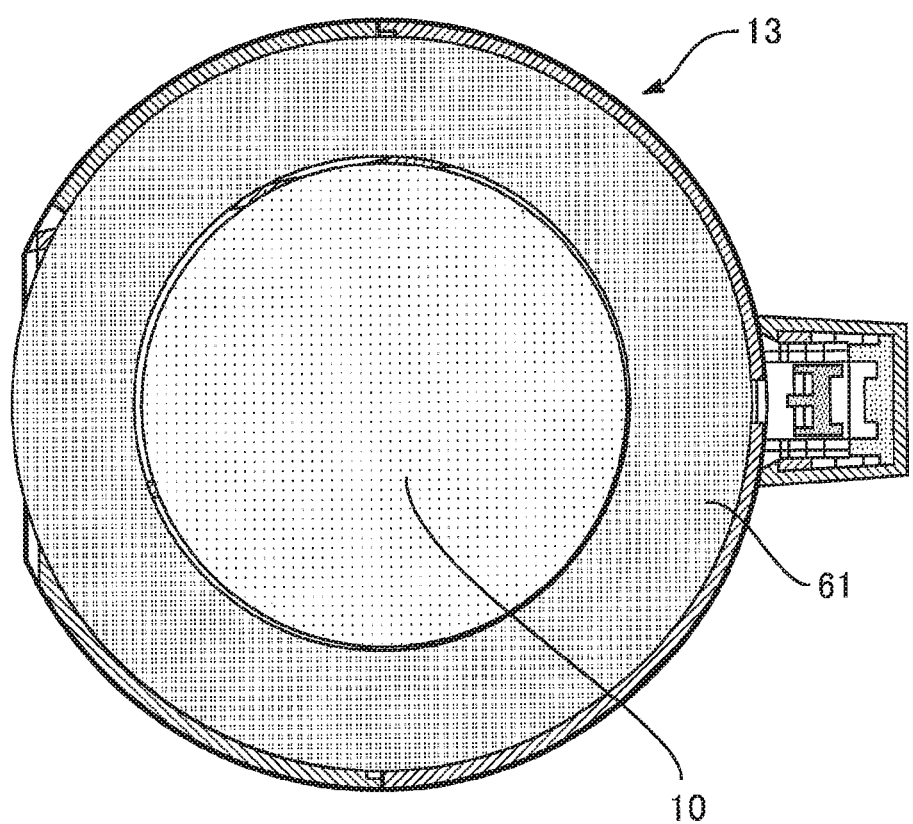
FIG. 14 is a top view of the dust collection unit, the filter unit, and the electric blower relating to Embodiment 3 of the present invention.

FIGS. 13 and 14 relate to Embodiment 3 of the present invention. FIG. 13 is a cross-sectional view corresponding to FIG. 6 illustrating a dust collection unit, a filter unit, and an electric blower, and FIG. 14 is a top view of the dust collection unit, the filter unit, and the electric blower.

In Embodiment 3 described here, the electric blower is positioned inside the ring of the filter unit in the configuration of Embodiment 1 described above.

Hereinafter, regarding an electric vacuum cleaner of Embodiment 3, description will be mainly given on the difference from Embodiment 1.

As illustrated in FIG. 13, the filter unit 61 is provided downstream of the discharge port 54 of the whirling chamber 29. In Embodiment 3, the electric blower 10 is positioned downstream of the discharge port 54 and upstream of the filter unit 61.

FIG. 14 illustrates an arrangement of respective units on a projection plane vertical to the whirling center axis of the whirling chamber 29, similar to FIG. 9 of Embodiment 1. As illustrated in FIG. 14, the filter unit 61 is provided in a ring shape on the projection plane. Similar to Embodiment 1, the filter unit 61 is positioned outside the discharge pipe 51 along the outer periphery of the discharge pipe 51 on the projection plane. The filter unit 61 has a pleated structure having a plurality of fold peaks in which the fold lines are arranged along the whirling center axis.

In Embodiment 3, the electric blower 10 is positioned inside the ring of the filter unit 61 on the projection plane. The electric blower 10 has a columnar outer shape. The outer peripheral face of the electric blower 10 faces the inner peripheral face of the filter unit 61. Further, the outer peripheral face of the electric blower 10 has a blower discharge port 56.

As illustrated in FIG. 13, the entire filter unit 61 is positioned outside the whirling chamber 29 in Embodiment 3. The electric blower 10 is positioned such that the blower suction port 55 is located immediately above the discharge port 54 formed in the bottom face of the discharge unit case 24, that is, the upper wall of the whirling chamber 29. In Embodiment 2, the electric blower 10 and the filter unit 61 may be housed in either the dust collection unit 13 or the housing unit 12.

In the electric vacuum cleaner 1 configured as described above, the air that entered the discharge pipe 51 from the whirling chamber 29 is discharged from the discharge port 54. The air discharged from the discharge port 54 is sucked into the electric blower 10 from the blower suction port 55. The air sucked into the electric blower 10 is discharged from the blower discharge port 56. The air discharged from the blower discharge port 56 passes from the inner peripheral side to the outer peripheral side of the ring of the filter unit 61. Then, the air that passed through the filter unit 61 and is cleaned is discharged to the outside of the cleaner body 6 through the discharge air duct 21, for example.

It should be noted that the other part of the configuration is the same as that of Embodiment 1. The detailed description thereof is omitted.

In the electric vacuum cleaner 1 configured as described above, the electric blower 10 is positioned so as to adjacent to the upper edge of the whirling chamber 29, and the exhaust of the whirling chamber 29 can be discharged to the outside of the cleaner body 6 after passing through the filter unit 61. Accordingly, in addition to the same effect as that of Embodiment 1, it is possible to further reduce the size of the cleaner body 6 by further reducing the vertical dimension including the electric blower 10, the whirling chamber 29, and the filter unit 61.

Further, it is possible to provide the filter unit 61 so as to surround the electric blower 10, and to effectively absorb, by the filter unit 61, fluid noise radiated when the electric blower 10 is driven. Accordingly, even in the case where the discharge port of the cleaner body 6 is positioned downstream of and immediately close to the filter unit 61, for example, the driving sound leaked to the outside of the cleaner body 6 can be reduced. Therefore, a user may use it without minding the driving sound of the electric blower 10.

INDUSTRIAL APPLICABILITY

The present invention is widely applicable to a cyclone-type electric vacuum cleaner in which the air is whirled in the whirling chamber to separate the dust from the air by the inertial force.

REFERENCE SIGNS LIST 1 electric vacuum cleaner
2 suction tool
3 connection pipe
5 suction pipe
6 cleaner body
7 handle
8 operation switch
10 electric blower
12 housing unit.
13 dust collection unit
14 container
17 discharge air duct forming unit
19 intake air duct
20 first connection port
21 discharge air duct
22 second connection port
24 discharge unit case
25 inflow unit case
26 dust collection unit case
27 inflow air duct
29 whirling chamber
30 zero-order dust collection chamber
31 primary dust collection chamber
32 out flow air duct.
33 cylindrical portion
34 conic portion
35 partition wall portion.
36 inflow pipe
38 connecting portion
39 primary opening
40 unit inflow port
41 main flow inlet
46 bottom part
47 outer wall part
48 zero-order opening
50 side wall part
51 discharge pipe
54 discharge port
55 blower suction port
56 blower discharge port
58 unit outflow port
59 narrow portion
60 wide portion
61 filter unit

The invention claimed is:

1. An electric vacuum cleaner comprising:
a whirling chamber configured to swirl air containing dust around a central axis to separate dust from the air containing dust, the whirling chamber having a discharge port for discharging air in the whirling chamber;
a discharge pipe provided in the whirling chamber along the central axis, the discharge pipe communicating with the discharge port; and
a filter provided on a downstream side of the discharge port,
the filter being positioned outside of the discharge pipe on a projection plane perpendicular to the central axis, a shape of the filter projected onto the projection plane being positioned outside of a shape of the discharge pipe projected onto the projection plane,
a portion of the filter being positioned inside the whirling chamber, and a remaining portion of the filter being positioned outside the whirling chamber,
wherein
a portion of the discharge pipe lower than an intermediate position of the discharge pipe is in a hollow conic shape having a diameter decreased in a downward direction; and a portion of the discharge pipe above the intermediate position is in a cylindrical shape.

2. The electric vacuum cleaner according to claim 1, further comprising
a blower configured to generate an air flow passing through the inside of the whirling chamber, wherein
the blower is positioned downstream of the filter, and
the filter is positioned along an outer periphery of the discharge pipe on the projection plane.

3. The electric vacuum cleaner according to claim 2, wherein
the filter is provided in an annular shape on the projection plane.

4. The electric vacuum cleaner according to claim 2, wherein
the blower is positioned such that the blower is adjacent to the filter and an air intake port of the blower faces the filter side, on the projection plane.

5. The electric vacuum cleaner according to claim 1, further comprising
a blower configured to generate an air flow passing through the inside of the whirling chamber, wherein
the blower is positioned downstream of the discharge port and upstream of the filter.

6. The electric vacuum cleaner according to claim 5, wherein the filter is provided in an annular shape on the projection plane, and the blower is positioned inside a ring of the filter on the projection plane.

7. The electric vacuum cleaner according to claim 1, wherein the filter has a pleated structure having a plurality of fold peaks in which fold lines are arranged along the center axis.

8. The electric vacuum cleaner according to claim 1, the whirling chamber having an upper wall, wherein the discharge pipe protrudes downward from the upper wall of the whirling chamber to an inside of the whirling chamber.

9. The electric vacuum cleaner according to claim 1, wherein the shape of the filter projected onto the projection plane has an inner periphery, the shape of the discharge pipe projected onto the projection plane has an outer periphery, the inner periphery is outside of and adjacent to the outer periphery.

10. The electric vacuum cleaner according to claim 9, wherein the filter is provided in an annular shape on the projection plane.

* * * * *